United States Patent
Ranka et al.

(10) Patent No.: US 6,751,421 B1
(45) Date of Patent: Jun. 15, 2004

(54) OPTICAL FIBER COMMUNICATION SYSTEM EMPLOYING WAVELENGTH CONVERTER FOR BROADBAND TRANSMISSION

(75) Inventors: Jinendra Kumar Ranka, Murray Hill, NJ (US); Andrew John Stentz, Clinton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/411,768

(22) Filed: Oct. 4, 1999

Related U.S. Application Data

(60) Provisional application No. 60/148,008, filed on Aug. 10, 1999.

(51) Int. Cl.$^7$ ............................................. H04B 10/12
(52) U.S. Cl. ................... 398/141; 398/173; 398/176; 398/177; 398/178; 398/147; 359/341; 359/333; 359/337
(58) Field of Search ................. 398/141, 173, 398/176, 177, 178, 147; 359/326, 333, 341, 337

(56) References Cited

U.S. PATENT DOCUMENTS

| | | | | |
|---|---|---|---|---|
| 5,267,073 A | | 11/1993 | Tamburello et al. ......... 359/179 |
| 5,386,314 A | * | 1/1995 | Jopson ....................... 359/326 |
| 5,438,445 A | * | 8/1995 | Nakano ....................... 359/124 |
| 5,452,116 A | * | 9/1995 | Kirkby et al. ................ 359/124 |
| 5,760,937 A | * | 6/1998 | Ishikawa et al. ............. 359/161 |
| 5,784,184 A | | 7/1998 | Alexander et al. .......... 359/125 |
| 6,038,356 A | * | 3/2000 | Kerfoot, III et al. .......... 385/24 |
| 6,115,173 A | * | 9/2000 | Tanaka et al. ............... 359/174 |
| 6,188,511 B1 | * | 2/2001 | Marcenac et al. ........... 359/344 |
| 6,330,104 B1 | * | 12/2001 | Kim et al. ................... 359/332 |
| 6,509,987 B1 | * | 1/2003 | Hunziker et al. ............ 359/124 |

FOREIGN PATENT DOCUMENTS

| | | |
|---|---|---|
| EP | 0 643 320 | 3/1995 |
| EP | 0 862 078 | 9/1998 |
| EP | 0 963 066 | 12/1999 |

\* cited by examiner

Primary Examiner—Leslie Pascal
Assistant Examiner—Hanh Phan

(57) ABSTRACT

The present invention uses wavelength conversion to increase the bandwidth of optical communication systems. In an exemplary embodiment, a combination of wavelength conversion and amplification with a discrete optical amplifier (OA) to allow communications systems to operate in wavelength bands $\lambda'$ outside the gain bandwidth of the OA. A transmitter launches signal channels $(\lambda_1', \lambda_2', \ldots, \lambda_N')$ that are outside the gain bandwidth $\lambda$. A wavelength conversion device upstream of the amplifier maps channels $\lambda_1', \lambda_2', \ldots \lambda_N'$ to corresponding wavelengths $\lambda_1, \lambda_2, \ldots \lambda_N$ within $\lambda$. The OA directly amplifies the converted signals and a second wavelength conversion device downstream of the amplifier maps the amplified signals back to the original channels $\lambda_1', \lambda_2', \ldots \lambda_N'$. This increases the capacity of the optical communication systems by facilitating the use of both signals that lie within the OA gain bandwidth $\lambda$ and signals that can be converted to wavelengths within $\lambda$. Associated wavelength converters, transmitters and receivers are also described.

This approach applies not only to the use of EDFAs, but also to gain-flattening elements, dispersion-compensating fibers, variable attenuators, and any intermediate components having bandwidths smaller than the transmission fiber.

3 Claims, 4 Drawing Sheets

OPTICAL FIBER COMMUNICATION SYSTEM EMPLOYING WAVELENGTH CONVERTER FOR BROADBAND TRANSMISSION

This application is a nonprovisional application based on Provisional Application No. 60/148,008, filed Aug. 10, 1999.

FIELD OF THE INVENTION

This invention relates to optical fiber communication systems and, in particular, to communication systems employing wavelength converters to enhance the bandwidth of transmission.

BACKGROUND OF THE INVENTION

Optical fiber communication systems are beginning to achieve their great potential for the rapid transmission of vast amounts of information. In essence, an optical fiber system comprises a light source, a modulator for impressing information on the light, an optical transmission waveguide for carrying the optical signals, and a receiver for detecting the signals and for demodulating the information they carry. Typically the transmission waveguide comprises a plurality of segments of optical fiber interconnected by optical components such as rare-earth doped fiber amplifiers. Increasingly, the optical signals are wavelength division multiplexed signals (WDM signals) comprising a plurality of distinct wavelength signal channels.

An important limitation on conventional fiber systems is the limited bandwidth of the optical components used in long distance transmission. While silica optical fibers have a wide bandwidth window of low loss transmission, some optical components intermediate fiber segments, such as erbium-doped fiber amplifiers, have more narrow bandwidths preventing full utilization of the transmission fiber window.

Silica optical fibers have an absorption coefficient less than 0.4 dB/km for wavelengths between 1250 and 1650 nm, making silica fibers suitable for long haul transmission over this entire spectrum. However current systems are typically limited to the wavelength range of 1530–1560 nm, where conventional erbium-doped silica fiber amplifiers (EDFAs) perform well. While prototypical EDFAs have been demonstrated over the wavelength range from 1530–1610 nm (see for example A. K. Srivastava et al., "1 Tb/s Transmission of 100 WDM 10 Gb/s Channels Over 400 KM of TrueWave™ Fiber", OFC '98 Post Deadline Paper PD10 (1998)), it is doubtful that the operating range of EDFAs will be expanded over a much wider wavelength range.

It is common for lossy elements, such as dispersion compensating fiber, gain flattening filters and variable attenuators, to be included within discrete amplifiers. The loss in these elements can exceed 20 dB such that an EDFA with a 25 dB external gain will have an internal gain of 45 dB. The noise figure of these amplifiers is typically less than 6 dB. Amplifiers will need to meet such requirements in order to be practical for many applications.

One alternative amplifier is the Raman amplifier. This amplifier can provide gain at any wavelength and has been demonstrated at 1300 nm and in the 1500 nm range (see for example P. B. Hansen et al., "High Sensitivity 1.3 $\mu$m Optically Preamplified Receiver Using Raman Amplification", Electron. Lett., Vol. 32, p.2164 (1996) and K. Rottwitt et al., "A 92 nm Bandwidth Raman Amplifier", OFC '98 Post Deadline Paper PD6 (1998)). Disadvantageously, Raman amplifiers require high pump powers. This is particularly true for high gain amplifiers.

Another alternative amplifier is a parametric amplifier (see for example E. Desurvire, Erbium Doped Fiber Amplifiers, p.451) (Wiley, 1994). These amplifiers are typically based on four wave mixing (FWM). They have the disadvantages of requiring very high pump powers and of requiring precise control of the fiber dispersion in order to achieve phase matching over long lengths of fiber.

Four wave mixing (FWM) can also be used for wavelength conversion and spectral inversion. Proposed applications of this technology include wavelength routers (S. J. B. Yoo, "Wavelength Conversion Technologies for WDM Network Applications", J. Lightwave Technology, Vol. 14, p. 955 (1996)), optical switching, and mid-span spectral inversion (S. Watanabe et al., "Exact Compensation for Both Chromatic Dispersion and Kerr Effect in a Transmission Fiber Using Optical Phase Conjugation", J. Lightwave Technology, Vol. 14, p. 243 (1996)). Communication systems have been demonstrated that employ FWM for spectral inversion over broad bandwidths (e.g. >70 nm) but without signal amplification (conversion efficiency of ∼−16 dB) (S. Watanabe et al., "Interband Wavelength Conversion of 320 Gb/s WDM Signal Using a Polarization-Insensitive Fiber Four-Wave Mixer", ECOC '98 (1998)). Using small effective area fibers, conversion efficiencies of up to 28 dB over 40 nm (G. A. Nowak, et. al., "Low-Power High-Efficiency Wavelength Conversion Based on Modulational Instability in High-Nonlinearity Fiber", Opt. Lett., Vol. 23, p.936 (1998)) are possible, however pump powers of 28 dBm are required. Single channel gain of ∼0 dB has been reported at pump power of 17 dBm in standard dispersion shifted fiber, however the fiber loss resulted in net loss of the converted signal (S. Watanabe et al., "Highly Efficient Conversion and Parametric Gain of Nondegenerate Forward Four-Wave Mixing in a Singlemode Fibre", Electron. Lett., Vol. 30, p. 163 (1994)). The results to date indicate that parametric amplification alone in silica fiber using pump powers less than 30 dBm will not be able to provide the gain needed for a discrete amplifier in a conventional terrestrial communications systems. Accordingly there is a need for a new kind of optical communication system for broadband transmission.

SUMMARY OF THE INVENTION

The present invention uses wavelength conversion to increase the bandwidth of optical communication systems. In an exemplary embodiment, a combination of wavelength conversion and amplification with a discrete optical amplifier (OA) to allow communications systems to operate in wavelength bands $\lambda'$ outside the gain bandwidth of the OA. A transmitter launches signal channels $(\lambda_1', \lambda_2', \ldots \lambda_N')$ that are outside the gain bandwidth $\lambda$. A wavelength conversion device upstream of the amplifier maps channels $\lambda'_1, \lambda'_2, \ldots \lambda'_N$ to corresponding wavelengths $\lambda_1, \lambda_2, \ldots \lambda_N$ within $\lambda$. The OA directly amplifies the converted signals and a second wavelength conversion device downstream of the amplifier maps the amplified signals back to the original channels $\lambda'_1, \lambda'_2, \ldots \lambda'_N$. This increases the capacity of the optical communication systems by facilitating the use of both signals that lie within the OA gain bandwidth $\lambda$ and signals that can be converted to wavelengths within $\lambda$. Associated wavelength converters, transmitters and receivers are also described.

This approach applies not only to the use of EDFAs, but also to gain-flattening elements, dispersion-compensating fibers, variable attenuators, and any intermediate components having bandwidths smaller than the transmission fiber.

BRIEF DESCRIPTION OF THE DRAWINGS

The advantages, nature and various additional features of the invention will appear more fully upon consideration of the illustrative embodiments now to be described in detail in connection with the accompany drawings. In the drawings.

It is to be understood that these drawings are for illustrating the concepts of the invention and are not to scale.

DETAILED DESCRIPTION

Figure 1:
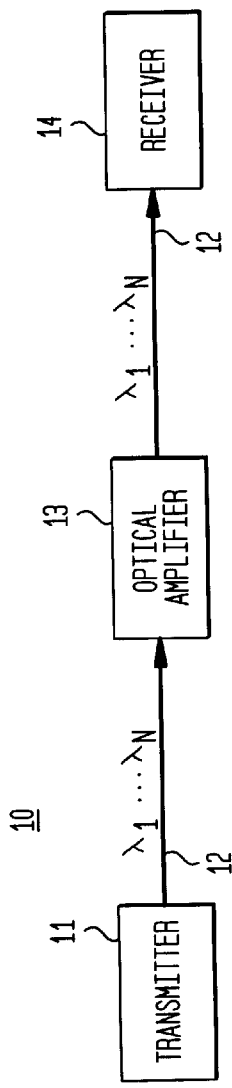
FIG. 1 is a schematic diagram of a conventional optical fiber communication system.

FIG. 1 schematically depicts a prior art optical fiber communication system 10 comprising a wavelength division multiplexed (WDM) transmitter 11, a length of transmission fiber 12, an EDFA optical amplifier 13 and a WDM receiver 14. The transmitter 11 launches signals $\lambda_1 \ldots \lambda_N$ which lie within the erbium gain bandwidth $\lambda$. The signals are directly amplified by the EDFA 13, and transmitted to receiver 14.

Figure 2:
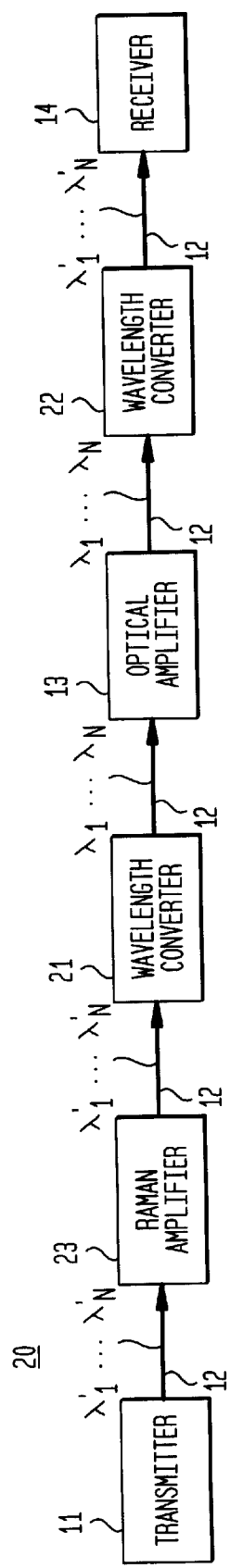
FIG. 2 illustrates an optical fiber communication system using an amplifier arrangement in accordance with the invention.

FIG. 2 depicts an optical communication system 20 employing a wavelength converter to increase the bandwidth. Here the transmitter 11 launches signals including channels $\lambda'_1 \ldots \lambda'_N$ which are in a wavelength band $\lambda'$ outside the bandwidth $\lambda$ of an intermediate optical component such as OA 13. After a transmission fiber segment 12, the signals $\lambda'_1 \ldots \lambda'_N$ are mapped by wavelength converter 21 to corresponding wavelengths $\lambda_1 \ldots \lambda_N$ within the OA gain bandwidth $\lambda$. A conventional EDFA optical amplifier 13 is used to directly amplify the signals $\lambda_1 \ldots \lambda_N$ and a second wavelength converter 22 can be used to map the amplified signals of wavelengths $\lambda_1 \ldots \lambda_N$ back to the original channels $\lambda'_1 \ldots \lambda'_N$. The wavelength converter can be based on four-wave mixing, on second-order nonlinear materials such as periodically polled lithium niobate or on semiconductor optical amplifiers. See S. Yoo, "Wavelength Conversion Technologies for WDM Network Applications", *IEEE J. Of Lightwave Technol.*, Vol. 14, p. 955 (1996).

In order to keep the noise figure of the proposed composite amplifier sufficiently low, it may be necessary for the wavelength converter to provide a gain between unity and 10 dB. However, most of the gain would still be provided by the discrete OA. This fact greatly reduces the requirements on the wavelength converter, allowing practical pump powers to achieve the necessary wavelength conversion via FWM in optical fibers.

Optionally and advantageously, a relatively small amount of Raman amplification could be added to the fiber span prior to the wavelength conversion by a fiber Raman preamplifier 23. This preamplification reduces the constraints on the noise figure and conversion efficiency of the first wavelength converter 21. See, for example, P. B. Hansen et al., "Capacity Upgrades of Transmission Systems by Raman Amplification", *IEEE Photon. Technol. Lett.*, Vol. 9, p. 262 (1997) for further details on Raman preamplification.

Figure 3:
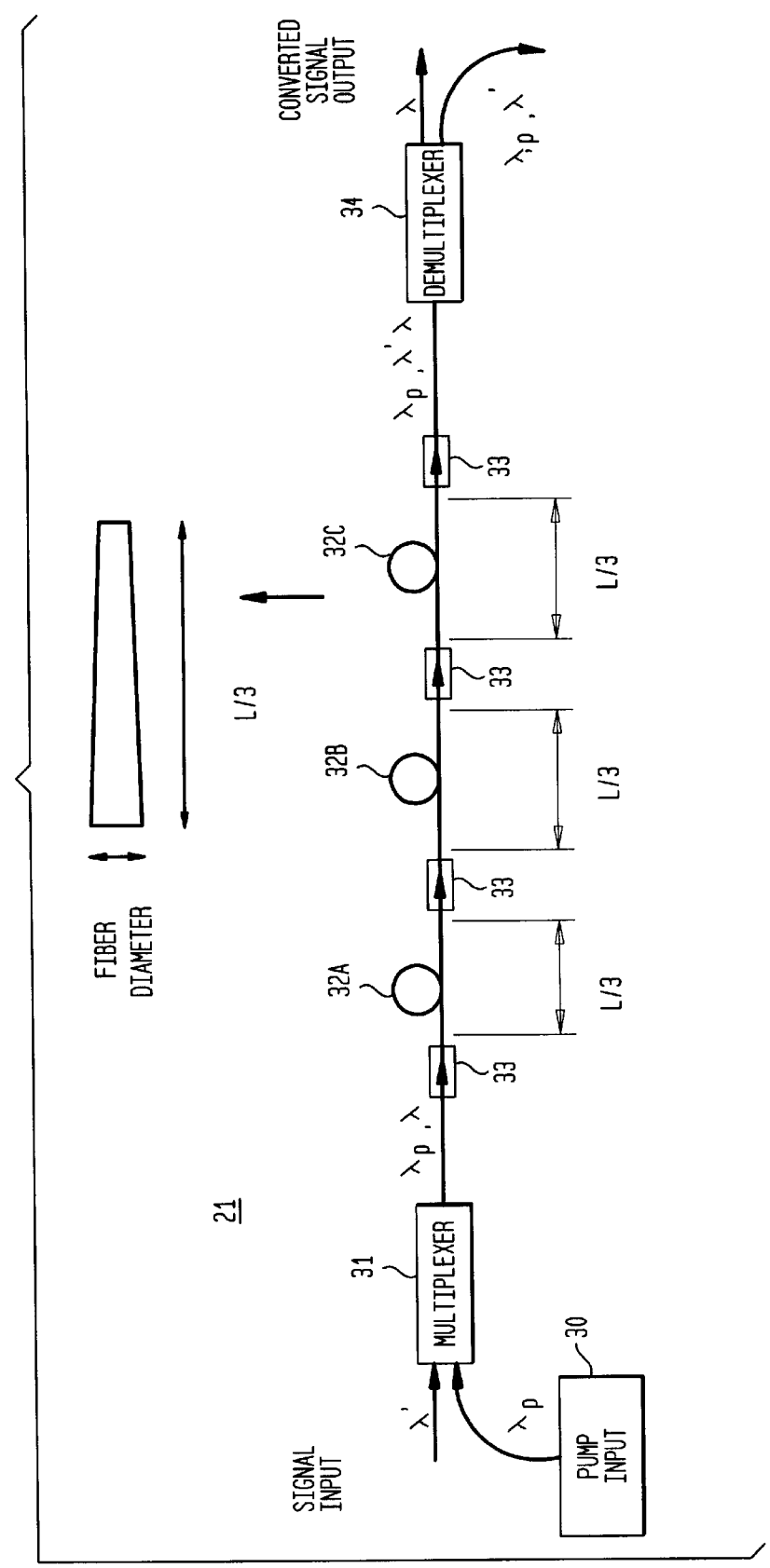
FIG. 3 shows a wavelength converter for the communication system of FIG. 2.

FIG. 3 illustrates a preferred wavelength conversion device for use in the system of FIG. 2 comprising a copropagating pump source 30, an upstream wavelength division multiplexer (WDM) 31 for mixing the signals in $\lambda'$ with the pump at $\lambda_p$, and a plurality of four-wave mixing sections (here three), each comprising a length of tapered fiber 32A, 32B, 32C. Interstage isolators 33 separate the mixing sections from each other and the rest of the system to prevent buildup of backscattered light. The output in $\lambda$ is taken from a demultiplexer 34 at the output.

In operation, a strong copropagating pump at $\lambda_p$ is mixed with signal band $\lambda'$ at upstream WDM 31. Four-wave mixing between $\lambda_p$ and $\lambda'$ in optical fiber sections 32A, 32B, 32C (typical total length L=15 Km) is used to generate a signal at the shifted wavelength $\lambda$. Due to phasematching considerations, the pump wavelength $\lambda_p$ should be near the zero-dispersion wavelength of the fiber sections 32A, 32B, 32C. To obtain the gain necessary in the initial converter, pump powers of >20 dBm are required. Stimulated Brillouin scattering (SBS) of a narrow linewidth pump can be significant at this power level and fiber length and will result in pump depletion through the generation of a backscattered wave (see for example G. P. Agrawal, *Nonlinear Fiber Optics*).

To suppress SBS. two techniques are shown:

1) The total length L of the mixing fiber is divided into three sections of length L/3 (32A, 32B, 32C) separated by interstage isolators 33 to prevent buildup of the backscattered light.

2) The frequency of the backscattered light (~10 GHz Stokes shift) is proportional to both the effective index of the fiber and the pump frequency. By varying the fiber diameter in each stage (see for example K. Shiraki et. al., "Suppression of Stimulated Brillouin Scattering in a Fibre by Changing the Core Radius", *Electron. Lett.* Vol. 31, p.668 (1995) and K. Tsujikawa et. Al., "New SBS Suppression Fiber with Uniform Chromatic Dispersion to Enhance Four-Wave Mixing", *IEEE Photon. Technol. Lett.*, Vol. 10, p. 1139 (1998)) and by broadening the time integrated frequency linewidth of the pump 30, the frequency of the generated backscattered wave can be modulated over several GHz. Since the Brillouin linewidth is ~20 MHz, the modulation will result in an increase of the SBS threshold.

FWM between channels in this stage would not be of concern due to the low signal levels prior to amplification. The converter can be made independent of the input signal polarization through use of a depolarized pump 30 (see for example M. M. Howerton et. al., "SBS Suppression Using a Depolarized Source for High Power Fiber Applications", *J. Liphtwave Technol.*, Vol. 14, p. 417 (1996)).

Figure 4:
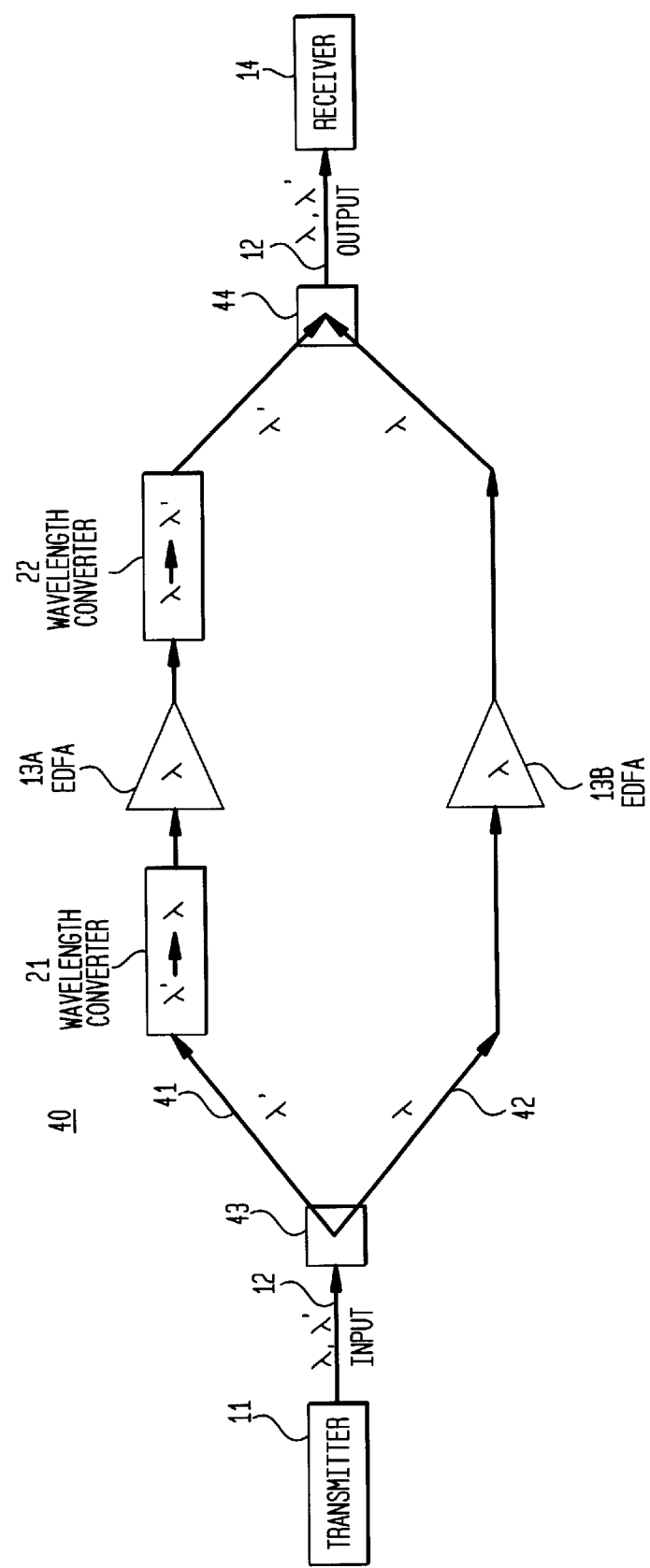
FIG. 4 illustrates an alternative optical fiber communication system.

FIG. 4 shows an alternative communication system 40 wherein transmitter 11 launches both wavelengths which lie within the EDFA amplification bandwidth $\lambda$ and wavelengths $\lambda'$ outside the EDFA bandwidth. The two wavelength bands ($\lambda, \lambda'$) are separated onto parallel paths 41, 42 by a demultiplexer 43. Channels in $\lambda$ on path 42 are amplified directly using an EDFA 13B and channels in $\lambda$ on path 41 are first converted to wavelengths in $\lambda$ by a first converter 21 and are then amplified using a second EDFA 13A. The wavelengths in $\lambda$ are converted back to wavelengths in $\lambda$ by a second converter 22. The two wavelength bands are then recombined by multiplexer 44 and continue down the transmission line 12 to receiver 14.

The conventional optical amplifiers in the systems of FIGS. 2 and 4 can provide signal gain greater than 20 dB and can contain gain flattening and dispersion compensating elements. The second wavelength converters 22 would require near unity gain to maintain high overall system efficiency. Due to the amplified signal levels in this stage, the noise figure of the second wavelength converter 22 is not as important compared to the first converter 21. FWM between channels would need to be minimized through the use of a high dispersion slope fiber 12.

Figure 5:
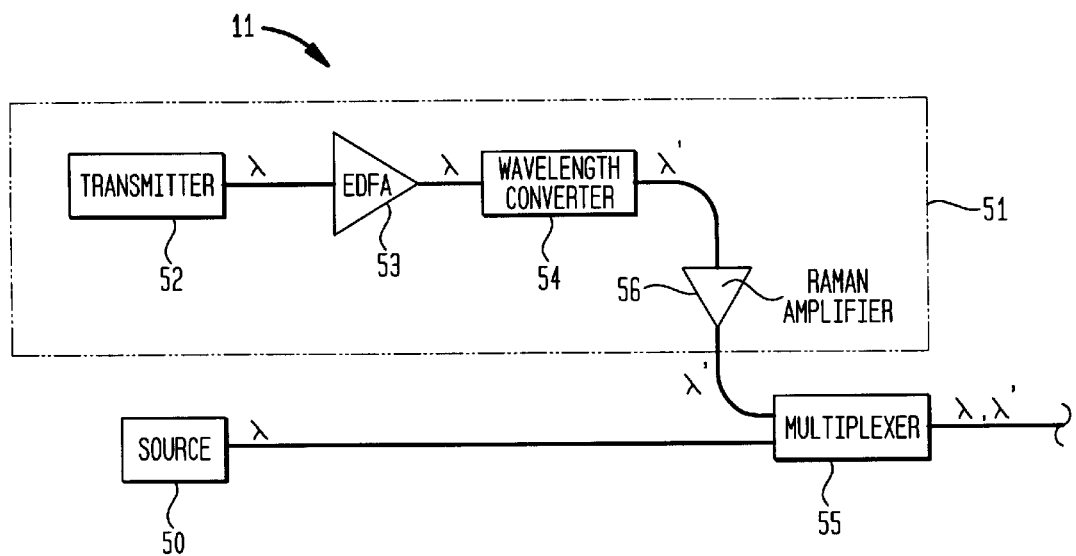
FIG. 5 shows an exemplary transmitter for the systems of FIGS. 2 and 4.

FIG. 5 illustrates an exemplary transmitter 11 capable of launching both wavelength channels which lie within the EDFA amplification bandwidth λ and wavelengths λ̃ outside λ. The transmitter 11 comprises a source 50 of wavelength channels in λ and a second source 51 of channels in λ̃. Source 51 comprises, in essence, a conventional transmitter 52 in λ, an EDFA 53 for amplifying the output of transmitter 52 and a wavelength converter 54 for mapping the λ wavelength channels to channels in λ̃. A multiplexer 55 combines the λ channels from source 50 with the λ̃ channels from source 51. An optional Raman amplifier 56 (e.g., 2 km fiber counterpumped at 5–10 dB) can be disposed between transmitter 52 and the multiplexer.

Figure 6:
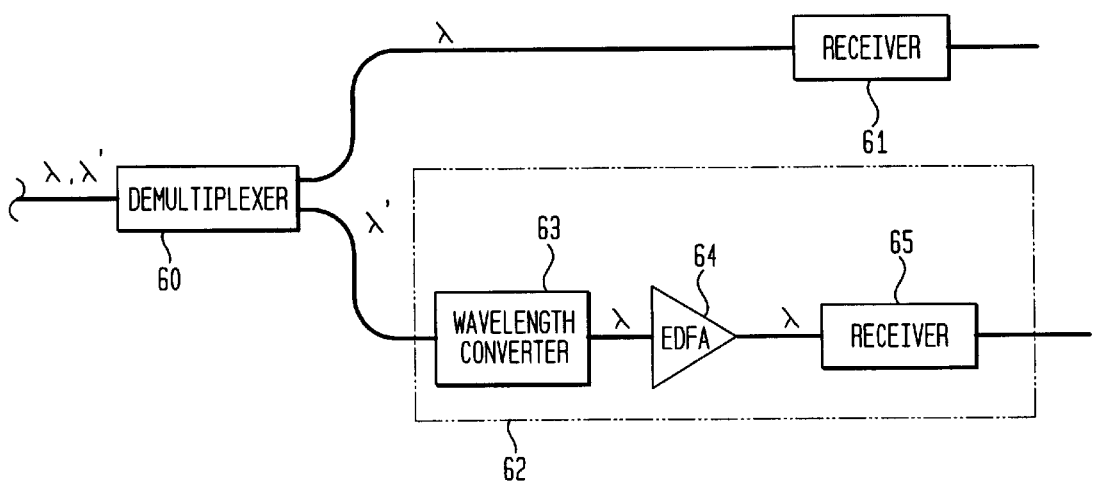
FIG. 6 illustrates an exemplary receiver for the systems of FIGS. 2 and 4.

FIG. 6 illustrates an exemplary receiver 14 capable of receiving wavelength channels in both λ and λ̃. The receiver comprises a demultiplexer 60 for separating the λ and λ̃ channels. The λ channels are directed to a first conventional receiver 61 for wavelengths in λ. The λ̃ channels are directed to a receiver 62 for wavelengths in λ̃. Receiver 62 can comprise a wavelength converter 63 for converting the λ̃ channels to λ and an EDFA 64 for amplifying the converted channels. The amplified converted channels are then directed to a second conventional receiver 65. Advantageously, the λ̃ channels are preamplified by an optional Raman amplifier 66 prior to conversion in 63.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. An optical communication system comprising:

an optical transmission path including a plurality of segments of optical waveguide having a first transmission bandwidth;

at least one optical component coupled between successive segments of waveguide, the component having a second bandwidth narrower than the first;

an optical transmitter for launching optical signals into the optical transmission path, the optical signals including at least one optical signal at a wavelength within the first bandwidth but outside the second bandwidth; and at least one wavelength converter upstream of the optical component for converting the at least one optical signal to a wavelength within the second bandwidth, the converter comprising at least three tapered mixing fibers configured for producing the wavelength conversion by four-wave mixing, wherein the mixing fibers are separated by isolators for limiting the build up of backscattered light.

2. The system of claim 1 further comprising an additional wavelength converter downstream of the optical component for converting the at least one optical signal from the optical component to a wavelength outside the second bandwidth but within the first.

3. The optical communication system of claim 1 further comprising a Raman amplifier disposed in the optical transmission path upstream of the wavelength converter.

* * * * *